UNITED STATES PATENT OFFICE.

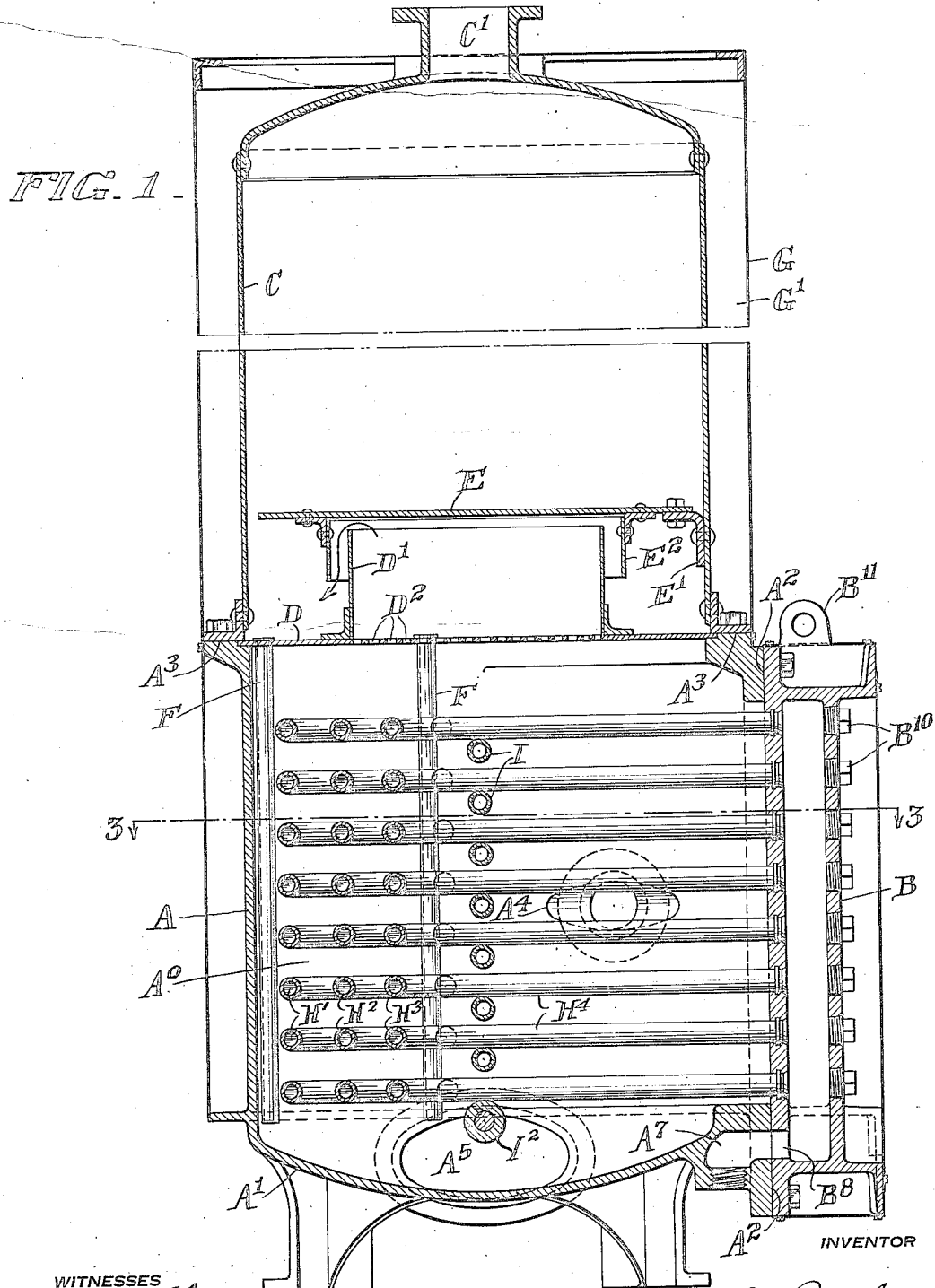

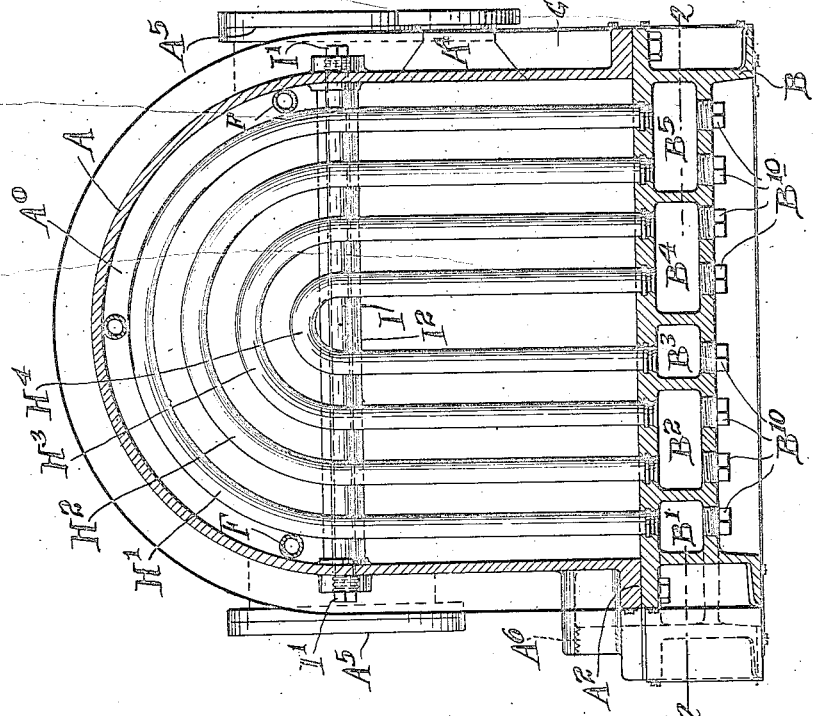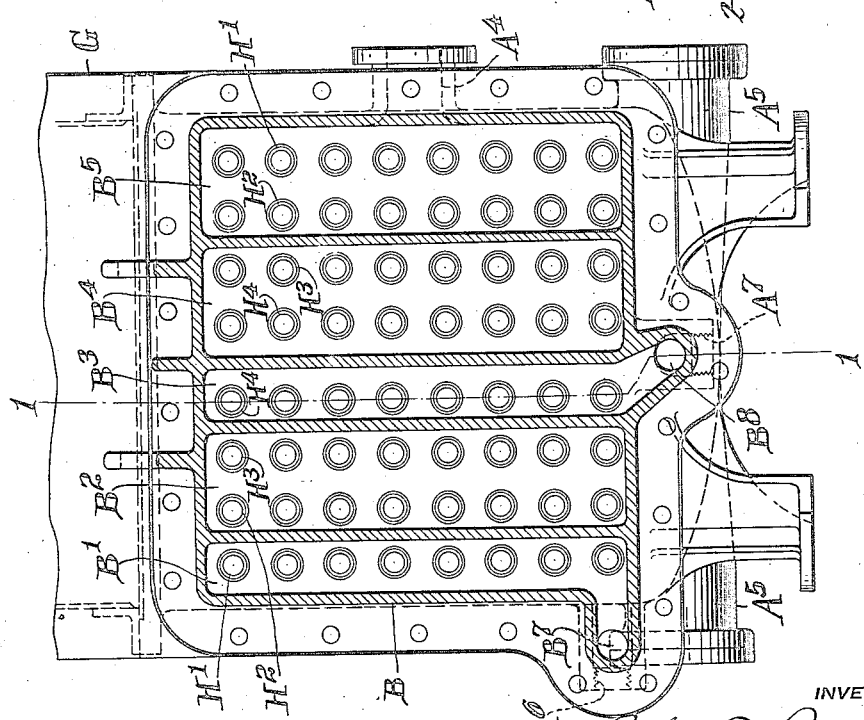

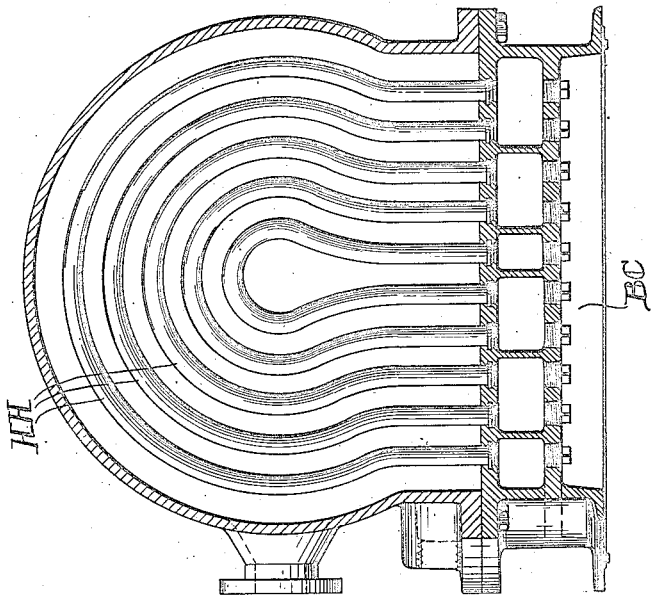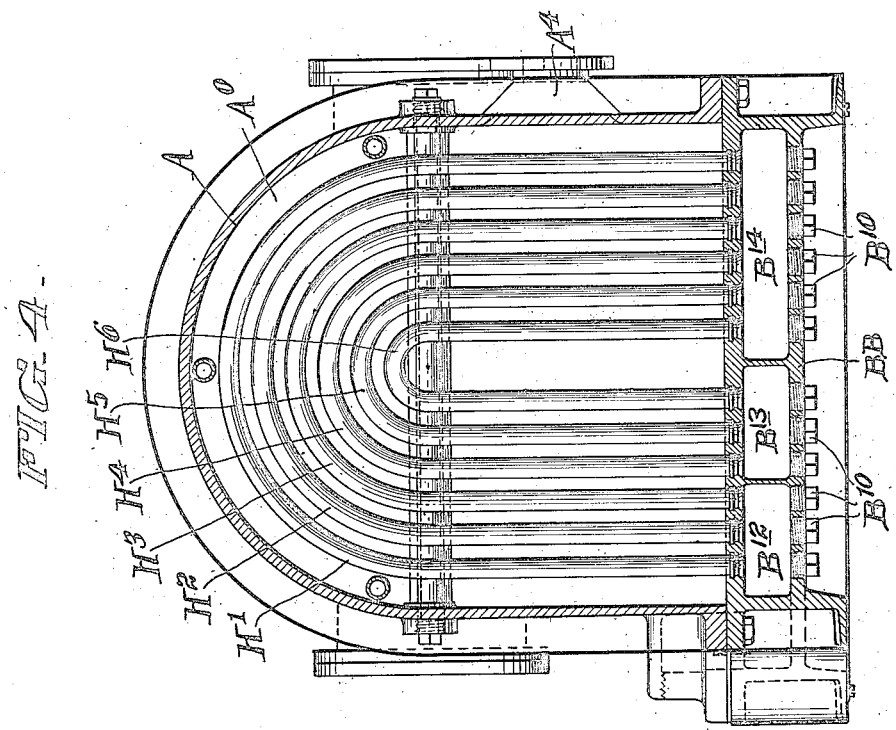

LUTHER D. LOVEKIN, OF PHILADELPHIA, PENNSYLVANIA.

HEAT-TRANSFERRING DEVICE.

1,139,548. Specification of Letters Patent. Patented May 18, 1915.

Application filed September 23, 1911. Serial No. 650,879.

*To all whom it may concern:*

Be it known that I, LUTHER D. LOVEKIN, a citizen of the United States of America, residing in the city and county of Philadelphia and in the State of Pennsylvania, have invented a certain new and useful Improvement in Heat-Transferring Devices, of which the following is a true and exact description, reference being had to the accompanying drawings, which form a part thereof.

While my present invention, comprises features of construction and arrangements especially devised for use in evaporators, such as are used in forming pure water from salt water by distillation, important features of the invention claimed are well adapted for general use in apparatus employed to effect the transfer of heat to or from a circulating fluid for many purposes, and the primary object of my invention is to provide improved apparatus of the general character specified characterized by its compactness, efficiency in operation, the low cost at which it can be manufactured, and the ease with which it may be cleaned and repaired when necessary.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described forms in which the invention may be embodied.

Of the drawings, Figure 1 is a sectional elevation of an evaporator suitable for use in forming pure water out of salt water by distillation and condensation, the section being taken on the line 1—1 of Fig. 2. Fig. 2 is a sectional elevation taken on the line 2—2 of Fig. 3. Fig. 3 is a sectional plan taken on the line 3—3 of Fig. 1. Fig. 4 is a view taken similarly to Fig. 3, showing a modification, and Fig. 5 is a view also taken similarly to Fig. 3 and showing still another modification.

In the drawings and referring first to the construction shown in Figs. 1, 2 and 3, A, represents the casing-body for the salt water containing chamber $A^0$. This body is formed with a closed bottom $A'$, and with an opening at one side, and with a seat $A^2$ which surrounds this opening and against which a member B may be removably secured. The member A is open at its upper end and is formed with a seat $A^3$ against which the lower end of the wall of the vapor chamber C of the evaporator is bolted. The member C is provided with an outlet $C'$ at its upper end, adapted to be connected by suitable piping to a condenser or other chamber into which the vapor is to be discharged. The water to be evaporated enters the chamber $A^0$ through the lateral port $A^4$, and at its lower end the member A is provided with sludge draw off openings $A^5$.

To dry the vapor passing from the water chamber to the steam chamber of the evaporator a plate or diaphragm D having ports $D^2$ formed in its central portion is extended across the top of the member A. The ported portion of the plate D is surrounded on the upper side of the plate by a tubular body $D'$ which loosely telescopes with a tubular body $E^2$ secured to the adjacent side of a disk E which is arranged within but is slightly less in diameter than the vapor chamber C and is supported from the latter by brackets $E'$. Liquid collecting above the plate D on the outer side of the tubular body $D'$ may flow back to the bottom of the chamber $A^0$ through drain tubes F.

G, represents a heat insulating casing surrounding the casing members A and C proper, and the space $G'$ between the casing G and members A and C may be filled by suitable heat insulating material.

The member B which is removably secured against the side opening in the member A is formed with a plurality of vertical chambers of which there are five: $B'$, $B^2$, $B^3$, $B^4$ and $B^5$, in the construction shown in Figs. 1, 2 and 3. Of these chambers $B'$ and $B^3$ serve as terminal chambers for the heating fluid. The chamber $B'$ communicates through a port $B^7$ with a steam inlet passage $A^6$ formed in the casing member A, and the chamber $B^2$ communicates through a port $B^8$ at its lower end with a drain passage $A^7$ also formed in the member A. The various chambers in the member B are connected for series flow through the chambers by a plurality of bowed tubes which are connected at their ends to the member B and have their bodies extending into the chamber A. As shown these tubes are arranged in parallel groups or layers at different levels, and each group or layer, as shown in Figs. 1, 2 and 3 comprises four tubes H', H², H³ and H⁴, which vary progressively in length and are nested together. Each set of tubes are shown as lying in the same plane, which should be practically horizontal, though the tubes may advantageously be inclined slightly so that condensed liquid will readily drain out of the tubes. Each group or layer of tubes serves to connect the various chambers in the member B for series flow therethrough, the opposite ends of each tube opening to separate chambers, and each of the chambers except the terminal chambers B' and B³ having connected to it one end of each of two tubes. As clearly shown in Fig. 3, the flow from the inlet chamber B is through the tube H' to the chamber B⁵ and from thence through tube H² to chamber B², from thence through tube H³ to the chamber B⁴, and from the latter through the tube H⁴ to the outlet chamber B³.

Advantageously the adjacent layers of tubes are separated by a distance slightly exceeding the tube diameter so that in case of injury to an inner tube the latter after being cut free from the head B may be first dropped into the space immediately above the next lower set of tubes and then be readily removed and a new tube correspondingly put in place in a similar manner. The ends of the tubes may be secured in the member B in any usual or suitable way, as by expanding them in the manner shown. Removable plugs B¹⁰ are employed to close apertures formed in the outer walls of the member B, one in line with each tube end.

To prevent undesirable sagging of the tubes I may suitably support each bank, as by means of a corresponding crossbar I, supported at its ends in apertures formed in the member A, the apertures being normally closed by plugs I'. To facilitate the bodily removal of the member B and of the attached tubes I prefer to make the support for the lower set of tubes a roller I². This roller serves as a guide and support for the tubes in the withdrawing operation.

B¹¹, represents ears formed on the upper end of the member B to facilitate the manipulation of the member B in assembling the apparatus, and taking the apparatus apart.

It will be understood that the number of tubes nesting together in each group or layer may be varied to suit conditions and in Figs. 4 and 5 I have shown arrangements differing from each other, and from the construction shown in Fig. 3 in the number of tubes employed in each group or layer. Where each pair of chambers in the tube supporting member are connected by but one tube in each group or layer, the number of chambers in the tube supporting member must be one greater than the number of tubes in each group. This numerical relation of tubes and chambers is not essential, however, as is shown in Fig. 4 for instance, where six tubes H', H², H³, H⁴, H⁵ and H⁶ in each nested group are employed to connect in series the two terminal chambers B¹² and B¹³ and the one intermediate chamber B¹⁴ formed in the tube supporting member B B. In this arrangement the flow between each directly connected pair of chambers is through three of the six tubes employed in each set. It will be obvious without further explanation that many different arrangements of tubes and chambers may be employed as conditions may make desirable.

While in general I prefer to employ tubes of simple U-shape it is apparent that other forms of bowed tubes may be employed, and in Fig. 5 I have illustrated an arrangement in which a portion of each tube H H is in the form of a circular arc of substantially more than 180°. This arrangement of tubes permits of the use of a casing body A A more nearly approaching a cylinder than does the member A of the constructions shown in Figs. 1, 2 and 3, and 4. The tube supporting member B C is essentially the same as the member B first described.

The ease with which the construction described can be assembled and repaired, and the comparatively low cost at which it can be manufactured, will be apparent to those skilled in the art without further explanation. It will also be apparent to those skilled in the art that the tube arrangement, characteristic of the invention, tends to high efficiency and minimum bulk of apparatus for the service performed. The volume of water in the boiling chamber is desirably small; the tubes are uniformly spaced and are close together, thus insuring a rapid and effective circulation of the liquid being boiled. The shape of the tubes insures freedom from troubles due to expansion and contraction. Since the drain and steam supply pipe connections are made to the casing member A, these pipe connections need not be interfered with when the member B is removed. The series flow of the heating fluid through the various chambers of the tube supporting member and a plurality of tubes is an important feature, as I have found, since in order to effectively and rapidly abstract the heat from steam flowing through a pipe it is essential that the pipe should have a considerable length and in general I may say that in apparatus of the type disclosed the length of pipe, (tubes connected in series) in each steam path between the inlet and outlet chambers should be equal in feet to not less than about thirteen or fourteen times the cross-sectional area of the tube passage in inches.

While in accordance with the provisions of the statutes I have illustrated and described the best forms of my invention now known to me, it will be apparent to those skilled in the art, that changes may be made in the form of the apparatus disclosed without departing from the spirit of my invention, and that in some cases certain features of the invention may be sometimes used with advantage without a corresponding use of other features.

Having now described my invention what I claim as new and desire to secure by Letters Patent is,

1. In a device of the kind described, a plurality of parallel tube groups each including two or more bowed tubes differing in length and nested together and a chambered member into which the tube ends are connected so that adjacent pairs of tube groups are separated by a distance slightly exceeding the diameter of an individual tube.

2. In a device of the kind described, a casing wall formed with a lateral aperture, a chambered member adapted to be secured to said wall to close said aperture and a plurality of parallel tube groups each consisting of two or more bowed tubes differing in length and nested together and having their ends secured into said member and tube supports connected at their ends into said casing wall and extending between each adjacent pair of tube groups.

3. In a device of the kind described, the combination with a casing wall formed with a lateral aperture, of a member adapted to be detachably secured to said casing wall to close said aperture, and a plurality of parallel tube groups arranged at successively higher levels and each consisting of two or more bowed tubes which differ in length from each other and are nested together and have their ends secured to said chambered member, and a roller support for one of said tube groups secured to said casing wall and adapted to form a support for the corresponding tube group as said member and attached tubes are being moved into and out of the position in which the member closes said aperture.

4. In a device of the kind described, the combination with a casing wall formed with a lateral aperture, a member adapted to be detachably connected to said wall to close said aperture, said member being formed with a plurality of chambers, and a plurality of bowed tubes having their ends connected to said member and connecting the chambers thereof, said member being formed with an inlet port opening into one of said chambers and an outlet port opening from another of said chambers, and said casing wall being formed with ports adapted to register with said inlet and outlet ports when said member is secured in place to close said aperture.

5. In a device of the kind described, the combination of a chambered casing formed with a lateral aperture in the lower portion of its wall, a chambered member detachably attached to said casing to close said aperture, bowed tubes each connected at its opposite ends to said chambered member and extending into the lower portion of said casing when said member is in its aperture closing position, means dividing said casing into a lower boiling compartment containing said tubes and an upper vapor compartment, said means comprising a lower centrally apertured diaphragm extending across said casing and an upper diaphragm also extending across said casing but arranged to provide vapor passages adjacent its periphery, and telescopic tubular baffles connected to the adjacent sides of said diaphragms, and one or more drain connections leading from the space above the lower diaphragm and surrounding the baffle connected thereto to the boiling compartment at a level well below its upper end.

LUTHER D. LOVEKIN.

Witnesses:
ARNOLD KATZ,
D. STEWART.